United States Patent
Chikagawa

(10) Patent No.: US 10,589,592 B2
(45) Date of Patent: Mar. 17, 2020

(54) AIR CONDITIONING DEVICE FOR VEHICLES

(71) Applicant: MITSUBISHI HEAVY INDUSTRIES THERMAL SYSTEMS, LTD., Tokyo (JP)

(72) Inventor: Noriyuki Chikagawa, Tokyo (JP)

(73) Assignee: MITSUBISHI HEAVY INDUSTRIES THERMAL SYSTEMS, LTD., Tokyo (JP)

(*) Notice: Subject to any disclaimer, the term of this patent is extended or adjusted under 35 U.S.C. 154(b) by 122 days.

(21) Appl. No.: 15/780,116

(22) PCT Filed: Mar. 1, 2017

(86) PCT No.: PCT/JP2017/008091
§ 371 (c)(1),
(2) Date: May 30, 2018

(87) PCT Pub. No.: WO2017/150606
PCT Pub. Date: Sep. 8, 2017

(65) Prior Publication Data
US 2018/0370323 A1    Dec. 27, 2018

(30) Foreign Application Priority Data

Mar. 4, 2016  (JP) .................. 2016-042715

(51) Int. Cl.
*B60H 1/00* (2006.01)
*B60H 1/12* (2006.01)
*B60H 1/32* (2006.01)

(52) U.S. Cl.
CPC ..... *B60H 1/00028* (2013.01); *B60H 1/00064* (2013.01); *B60H 1/00564* (2013.01); *B60H 1/12* (2013.01); *B60H 1/3227* (2013.01)

(58) Field of Classification Search
CPC .. B60H 1/00028; B60H 1/00564; B60H 1/12; B60H 1/00064; B60H 1/00057;
(Continued)

(56) References Cited

U.S. PATENT DOCUMENTS 5,673,964 A * 10/1997 Roan .................. B60H 1/00028
296/208
5,775,407 A * 7/1998 Inoue ................. B60H 1/00064
165/203

(Continued)

FOREIGN PATENT DOCUMENTS

JP    10-230733 A    9/1998
JP    2004-243881 A    9/2004
(Continued)

OTHER PUBLICATIONS

International Search Report (Forms PCT/ISA/210) for International Application No. PCT/JP2017/008091, dated May 9, 2017, with an English translation.
(Continued)

*Primary Examiner* — Jianying C Atkisson
*Assistant Examiner* — Jose O Class-Quinones
(74) *Attorney, Agent, or Firm* — Birch, Stewart, Kolasch & Birch, LLP

(57) ABSTRACT

An air conditioning device for vehicles including an evaporator for cooling air; a heater core for heating air; and a unit case having formed therein a cooling space for accommodating the evaporator, a heating space for accommodating the heater core, and an air mixing space connected to the cooling space and the heating space. A pair of foot flow passages is in communication with the unit case, the pair of foot flow passages extending from the air mixing space and being arranged at a distance from each other in the width direction of the vehicle so as to sandwich a rear face flow (Continued)

passage in the width direction. The rear face flow passage and at least a part of each of the foot flow passages overlap each other when viewed in the width direction.

4 Claims, 4 Drawing Sheets

(58) Field of Classification Search
CPC ............ B60H 1/10; B60H 2001/00092; B60H 2001/00192; B60H 2001/002
See application file for complete search history.

(56) References Cited

U.S. PATENT DOCUMENTS

| | | | | |
|---|---|---|---|---|
| 5,890,651 A * | 4/1999 | Kanda | ................ | B60H 1/00064 236/49.3 |
| 5,934,989 A | 8/1999 | Yamamoto | | |
| 6,045,444 A * | 4/2000 | Zima | ................ | B60H 1/00028 165/103 |
| 6,148,904 A * | 11/2000 | Tsunooka | ........... | B60H 1/00064 165/204 |
| 6,244,335 B1 * | 6/2001 | Nakamura | ......... | B60H 1/00028 165/203 |
| 6,311,763 B1 * | 11/2001 | Uemura | ............. | B60H 1/00664 165/43 |
| 6,569,009 B2 * | 5/2003 | Nishikawa | ......... | B60H 1/00692 454/121 |
| 6,644,559 B2 * | 11/2003 | Kondo | ............... | B60H 1/00064 237/12.3 B |
| 6,994,157 B1 * | 2/2006 | Arold | ................ | B60H 1/00064 165/203 |
| 7,156,166 B2 * | 1/2007 | Bendell | .............. | B60H 1/00028 165/203 |
| 7,726,391 B2 * | 6/2010 | Seo | .................... | B60H 1/00064 165/202 |
| 9,180,751 B2 * | 11/2015 | Han | ................... | B60H 1/00692 |
| 2004/0194948 A1 | 10/2004 | Shibata et al. | | |
| 2005/0205247 A1 * | 9/2005 | Ezaki | ................. | B60H 1/00028 165/204 |
| 2007/0266726 A1 | 11/2007 | Tada et al. | | |
| 2010/0263828 A1 | 10/2010 | Chikagawa et al. | | |
| 2011/0284183 A1 * | 11/2011 | Yamashita | ......... | B60H 1/00678 165/63 |
| 2016/0152110 A1 * | 6/2016 | Kim | ..................... | B60H 1/0005 165/203 |

FOREIGN PATENT DOCUMENTS

| | | |
|---|---|---|
| JP | 3931818 B2 | 6/2007 |
| JP | 2007-307928 A | 11/2007 |
| JP | 2009-286286 A | 12/2009 |
| JP | 2010-162946 A | 7/2010 |

OTHER PUBLICATIONS

Written Opinion of the International Searching Authority (Form PCT/ISA/237) for International Application No. PCT/JP2017/008091, dated May 9, 2017, with an English translation.

* cited by examiner

AIR CONDITIONING DEVICE FOR VEHICLES

TECHNICAL FIELD

The present invention relates to air conditioning devices for vehicles.

This application claims priority based on JP 2016-042715 filed in Japan on Mar. 4, 2016, of which the contents are incorporated herein by reference.

BACKGROUND ART

An air conditioning device installed in a vehicle such as an automobile appropriately mixes cold air generated through an evaporator with hot air from a heater core to deliver air at a desired temperature. The mixed air is distributed via flow passages, and sent to various regions inside the vehicle. The distributed air is sent to, for example, a center face air outlet and side face air outlets open toward upper portions of front seats of the vehicle and front foot air outlets open toward foot portions of the front seats.

Furthermore, air conditioning devices configured to send air toward rear seats have also been in practical use in recent years. Such an air conditioning device includes rear face air outlets sending air to upper portions of rear seats and rear foot air outlets sending air to foot portions of the rear seats (for example, see Patent Document 1).

CITATION LIST

Patent Document

Patent Document 1: JP 2004-243881A

SUMMARY OF INVENTION

Technical Problem

To reserve spaces to install other units such as engines and areas of indoor spaces, the size and the build of air conditioning devices installed in vehicles are required to be as small as possible. That is, routing and layouts of duct portions running toward air outlets need to be considered. In particular, the size of the vehicles in the front-back direction needs to be reduced.

However, in the device described in Patent Document 1, routing of duct portions is given a higher priority, and conditioned air flowing toward a center face air outlet is partially taken out through small openings formed in door members and used as rear face air. As a result, the volume of air heading toward the rear face air outlets is limited in the device.

The present invention is produced to solve the above-described problem, and aims to provide an air conditioning device for a vehicle that is small yet capable of supplying a sufficient volume of air.

Solution to Problem

An air conditioning device for a vehicle according to a first aspect of the present invention is disposed inside the vehicle, and includes an evaporator configured to cool air; a heater core configured to heat air; and a unit case including a cooling space accommodating the evaporator, a heating space accommodating the heater core and connected to the cooling space, and an air mixing space connected to the cooling space and the heating space. The air mixing space communicates with a center face flow passage, a side face flow passage, and a rear face flow passage. The unit case communicates with a pair of foot flow passages extending from the air mixing space and disposed at a distance from each other in a width direction of the vehicle to hold the rear face flow passage between the pair of foot flow passages in the width direction. The rear face flow passage and the foot flow passages overlap each other at least a part when seen in the width direction.

According to this configuration, the rear face flow passage and the foot flow passages partially overlap each other when seen in the width direction of the vehicle. This results in a reduction in size of the device in the front-back direction of the vehicle. Furthermore, the rear face flow passage is independent from the other flow passages. This allows the air inside the air mixing space to be directly led to the rear face flow passage without the volume of air being reduced.

In accordance with an air conditioning device for a vehicle according to a second aspect of the present invention, in the first aspect, the rear face flow passage may include a pair of rear face flow passages disposed to hold the center face flow passage from both sides of the center face flow passage in the width direction; and the side face flow passage may include another side face flow passage, and each of the side face flow passages may be disposed between the center face flow passage and the corresponding rear face flow passage.

According to this configuration, each of the side face flow passages is disposed between the center face flow passage and the corresponding rear face flow passage. That is, the flow passages are disposed in the width direction of the vehicle. This results in a reduction in size of the device in the front-back direction of the vehicle.

In accordance with an air conditioning device for a vehicle according to a third aspect of the present invention, in the first or second aspect, the part at which the rear face flow passage and the foot flow passages overlap each other when seen at least in the width direction may extend vertically.

According to this configuration, the overlapping part of the rear face flow passage and the foot flow passages extends vertically. Thus, the size of the device in the front-back direction of the vehicle can be reduced compared with a case where the flow passages extend in the front-back direction of the vehicle.

In accordance with an air conditioning device for a vehicle according to a fourth aspect of the present invention, in any one of the first to third aspects, the pair of foot flow passages may join together downstream of the overlapping part when seen in the width direction.

According to this configuration, the pair of foot flow passages join together downstream of the part where the foot flow passages and the rear face flow passage overlap each other. This ensures a large volume of air supplied from the foot flow passages compared with a case where the foot flow passages extend independently.

Advantageous Effects of Invention

According to the present invention, an air conditioning device for a vehicle that is small yet capable of supplying a sufficient volume of air can be provided.

DESCRIPTION OF EMBODIMENTS

Figure 1:
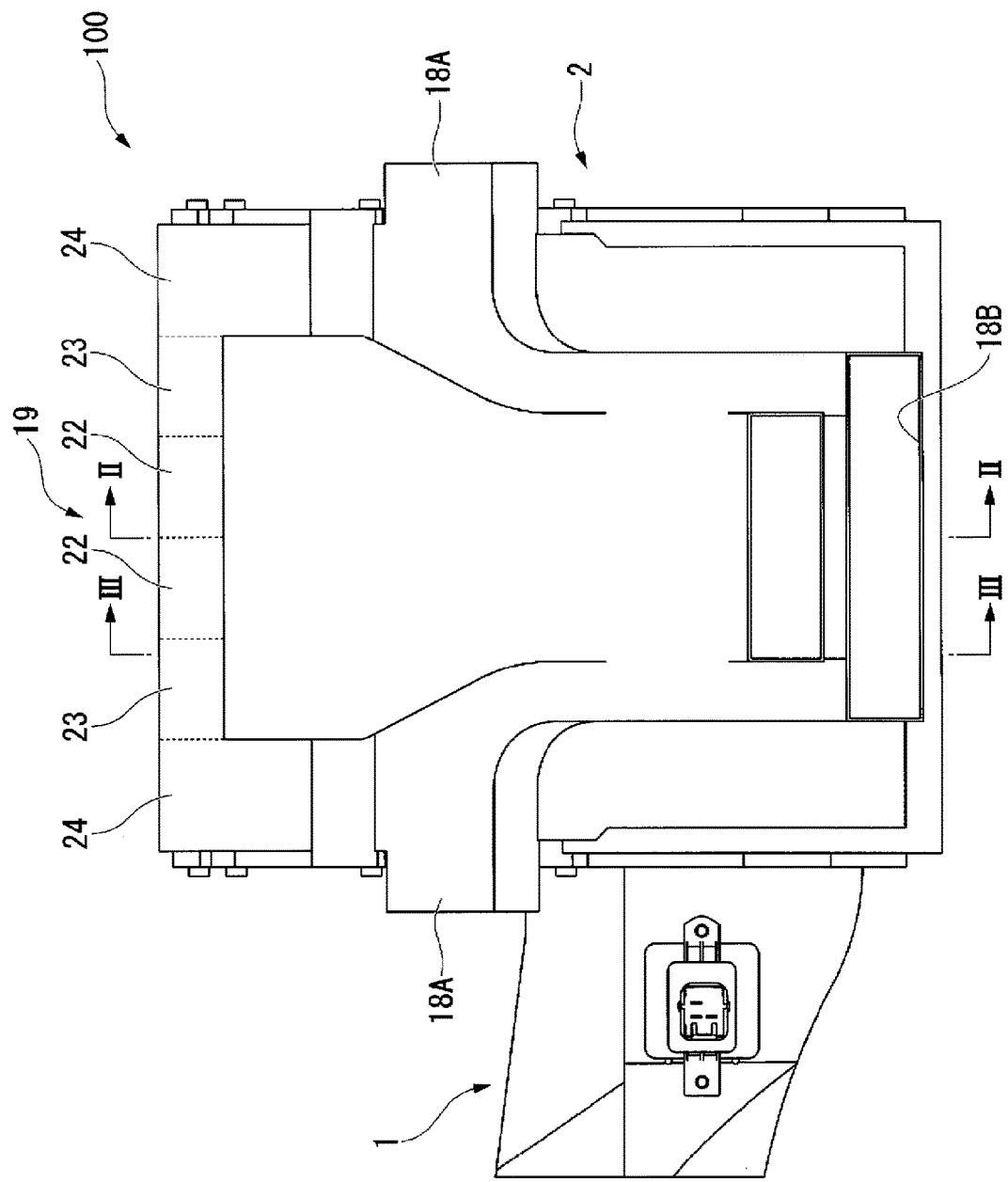
FIG. 1 is a view of an air conditioning device for a vehicle according to an embodiment of the present invention seen from a side in a front-back direction of the vehicle.
Figure 2:
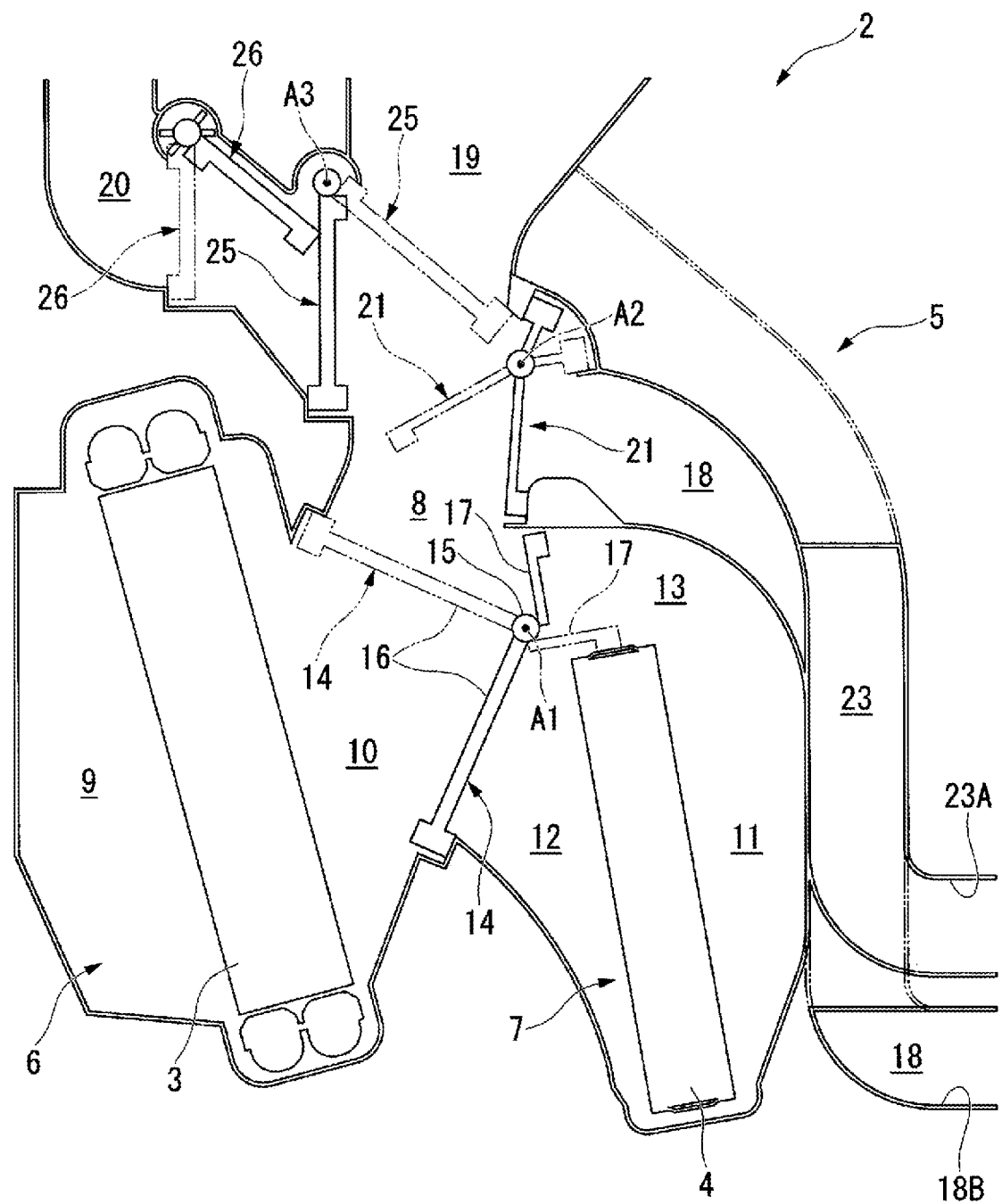
FIG. 2 is a view taken along line II-II of FIG. 1 as seen in the direction of arrows.
Figure 3:
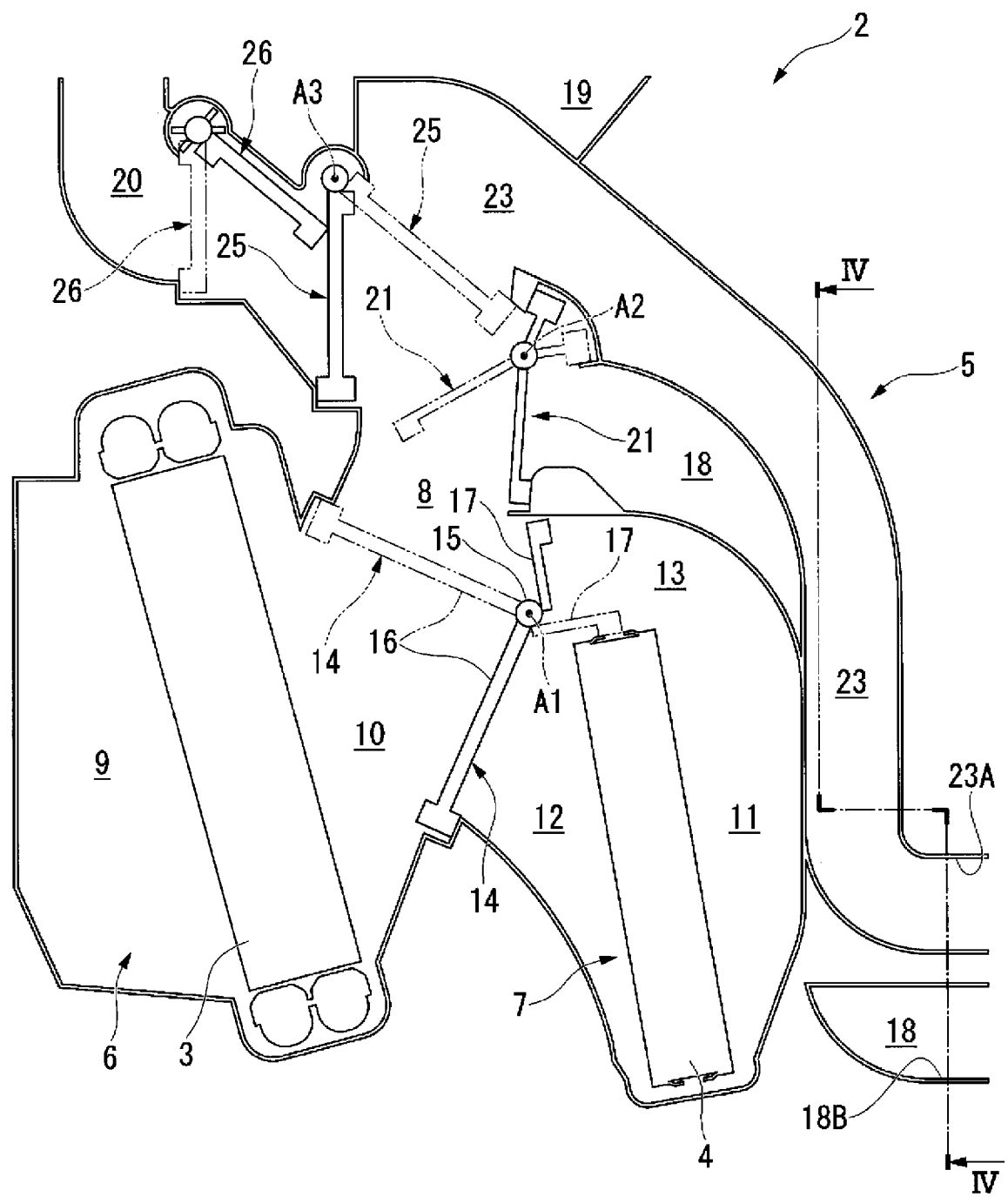
FIG. 3 is a view taken along line III-III of FIG. 1 as seen in the direction of arrows.

An embodiment of the present invention will be described below with reference to the drawings. FIG. 1 is a view of an air conditioning device 100 for a vehicle according to this embodiment seen from a side (rear side) in a front-back direction of the vehicle. FIG. 2 is a view taken along line II-II of FIG. 1 as seen in the direction of arrows. FIG. 3 is a view taken along line III-III of FIG. 1 as seen in the direction of arrows. In the description below, the front-back direction of the vehicle is simply referred to as "front-back direction". The direction orthogonal to the front-back direction in a horizontal plane is referred to as "width direction".

As illustrated in FIG. 1, the air conditioning device 100 includes a blower 1 including, for example, a sirocco fan (not illustrated) and an air conditioning unit 2 that adjusts the temperature of wind generated by the blower 1. The blower 1 is attached to one side of the air conditioning unit 2 in the width direction. More specifically, in this embodiment, when seen from the rear side in the front-back direction of the vehicle, the blower 1 is attached to the left side of the air conditioning unit 2. The blower 1 is connected with a power source (not illustrated). A fan inside the blower 1 rotates using the power supplied by the power source, and thus air with a certain flow rate is introduced into the air conditioning unit 2.

Next, a configuration of the air conditioning unit 2 will be described in detail with reference to FIG. 2. As illustrated in FIG. 2, the air conditioning unit 2 includes an evaporator 3, a heater core 4, a unit case 5 that accommodates the evaporator 3 and the heater core 4, and multiple dampers (an air mixing damper 14, a foot damper 21, a face damper 25, and a defrost damper 26) that adjust air flows inside the unit case 5.

The evaporator 3 may be, for example, a heat exchanger for cooling using vapor-compression refrigeration cycle. A low-pressure refrigerant flowing in the evaporator 3 evaporates by absorbing heat from air flowing around the evaporator 3 to cool the air. In this embodiment, the evaporator 3 has a thick plate shape.

The heater core 4 may be a hot-water heat exchanger for heating configured to heat air using hot water (engine cooling fluid) supplied from the vehicle engine (not illustrated) or other components. The hot water flowing inside the heater core 4 provides a quantity of heat for air flowing around the heater core 4 to heat the air. In this embodiment, the heater core 4 has a thick plate shape as does the evaporator 3.

The unit case 5 accommodates the evaporator 3 and the heater core 4, and includes air flow passages inside the unit case 5. More specifically, a cooling space 6, a heating space 7, and an air mixing space 8 are formed inside the unit case 5.

The cooling space 6 accommodates the evaporator 3. The evaporator 3 partitions the cooling space 6 into two spaces. More specifically, the cooling space 6 includes an introduction space 9 and a cold-air supply space 10. The introduction space 9 is a space, formed at one side of the evaporator 3, into which air introduced by the blower 1 flows. The cold-air supply space 10 is a space, formed at the other side of the evaporator 3 (space formed at a side of the evaporator 3 opposite the side on which the introduction section lies), into which air cooled by the evaporator 3 flows. That is, air inside the introduction space 9 is cooled by the contact with the evaporator 3 due to ventilation by the fan, and flows into the cold-air supply space 10.

The heating space 7 accommodates the heater core 4. The heating space 7 communicates with the cooling space 6 via part of the air mixing space 8 described later. More specifically, the heating space 7 faces the cooling space 6 from a side on which the cold-air supply space 10 lies. The heater core 4 partitions the heating space 7 into three spaces. The heating space 7 includes a second introduction space 11, a hot-air supply space 12, and a return space 13. The second introduction space 11 is a space, formed at one side of the heater core 4 (that is, the side facing the cooling space 6), into which air supplied by the cold-air supply space 10 is introduced. The hot-air supply space 12 is a space, formed at the other side of the heater core 4 (space formed at a side of the heater core 4 opposite the side on which the second introduction section lies), into which air heated by the heater core 4 flows. That is, air inside the second introduction space 11 is heated by the contact with the heater core 4, and flows into the hot-air supply space 12.

Furthermore, the heating space 7 includes another space between an upper end portion of the heater core 4 and an inner wall of the unit case 5. This space is defined as the return space 13 for returning air passing through the second introduction space 11 and the hot-air supply space 12 in sequence into the air mixing space 8 described later.

The cooling space 6 and the heating space 7 having the above-described configurations communicate with each other via the air mixing space 8. More specifically, the air mixing space 8 is a flow passage extending upward while communicating with the cold-air supply space 10 in the cooling space 6 and the hot-air supply space 12 in the heating space 7. Air cooled in the cooling space 6 (cold air) and air heated in the heating space 7 (hot air) are mixed inside the air mixing space 8.

The air mixing space 8 includes the air mixing damper 14 that adjusts the mixing ratio of the air introduced from the cooling space 6 and the air introduced from the heating space 7. As illustrated in FIG. 2, the air mixing damper 14 is a planar member rotatably supported at an outlet of the heating space 7. More specifically, the air mixing damper 14 includes a first rotating shaft portion 15, an air mixing damper body 16, and a reheating prevention damper 17. The first rotating shaft portion 15 rotates about a first axial line A1 extending in the width direction of the vehicle. The air mixing damper body 16 extends from the first rotating shaft portion 15 in a plane intersecting with the width direction.

The air mixing damper 14 having the above-described configuration is rotatable between a position indicated by solid lines (maximum cooling position) in FIG. 2 and a position indicated by dashed lines (maximum heating position) in FIG. 2. At the maximum cooling position, the air mixing damper body 16 and the reheating prevention damper 17 separate the cooling space 6 and the heating space 7 from each other. On the other hand, at the maximum heating position to which the air mixing damper body 16 and the reheating prevention damper 17 are rotated counterclockwise from the maximum cooling position, the cooling space 6 and the heating space 7 communicate with each other. Furthermore, at the maximum heating position, the air mixing space 8 and the return space 13 and the hot-air supply space 12 in the heating space 7 communicate with each other.

An upper portion of the air mixing space 8 communicates with foot flow passages 18, a face flow passage 19, and a defrost flow passage (defroster flow passage) 20. First ends of the foot flow passages 18 communicate with the air mixing space 8, and second ends communicate with front foot outlets 18A and a rear foot outlet 18B formed inside the vehicle. In more detail, as illustrated in FIG. 1, the foot flow passages 18 communicate with the pair of front foot outlets 18A and the rear foot outlet 18B. Each of the front foot outlets 18A opens outward in the width direction when seen in the front-back direction. On the other hand, the rear foot outlet 18B opens backward in the front-back direction.

As illustrated in FIG. 2, the foot damper 21 that switches the airflow state (open-close state) of the foot flow passages 18 is disposed at the first ends of the foot flow passages 18. The foot damper 21 is a planar member rotatable about a second axial line A2 extending in the width direction. When the foot damper 21 is in a close state, that is, when the foot damper 21 is located at a position indicated by solid lines in FIG. 2, the foot flow passages 18 are closed by the foot damper 21. On the other hand, when the foot damper 21 is in an open state, that is, when the foot damper 21 is located at a position indicated by dashed lines in FIG. 2, the foot flow passages 18 are open.

The air mixing space 8 communicates with one end of the face flow passage 19 at a position above the foot flow passages 18. The other end of the face flow passage 19 communicates with face air outlets formed inside the vehicle. The face air outlets are air outlets configured to send air mainly toward upper bodies of occupants sitting in the front seats. Furthermore, the face air outlets include a center face air outlet configured to send air to a central region in the width direction inside the vehicle and a pair of side face air outlets configured to send air to regions at both sides in the width direction. For example, an occupant sitting in the driver's seat receives air from the center face air outlet and the side face air outlet at the right side in the width direction when facing forward.

As illustrated in FIG. 1, the face flow passage 19 is partitioned into five sections aligned in the width direction. In more detail, an end portion of the face flow passage 19 (opening adjacent to the unit case 5) is partitioned into a center face flow passage 22, a pair of rear face flow passages 23, and a pair of side face flow passages 24. The center face flow passage 22 is located at the center in the width direction. The pair of rear face flow passages 23 are disposed to hold the center face flow passage 22 from both sides of the center face flow passage 22 in the width direction. The pair of side face flow passages 24 are disposed at both sides of the rear face flow passages 23 in the width direction.

The center face flow passage 22 communicates with the center face air outlet, and the side face flow passages 24 likewise communicate with the above-described side face air outlets. The rear face flow passages 23 are air outlets configured to send air mainly toward upper bodies of occupants sitting in the rear seats.

Figure 4:
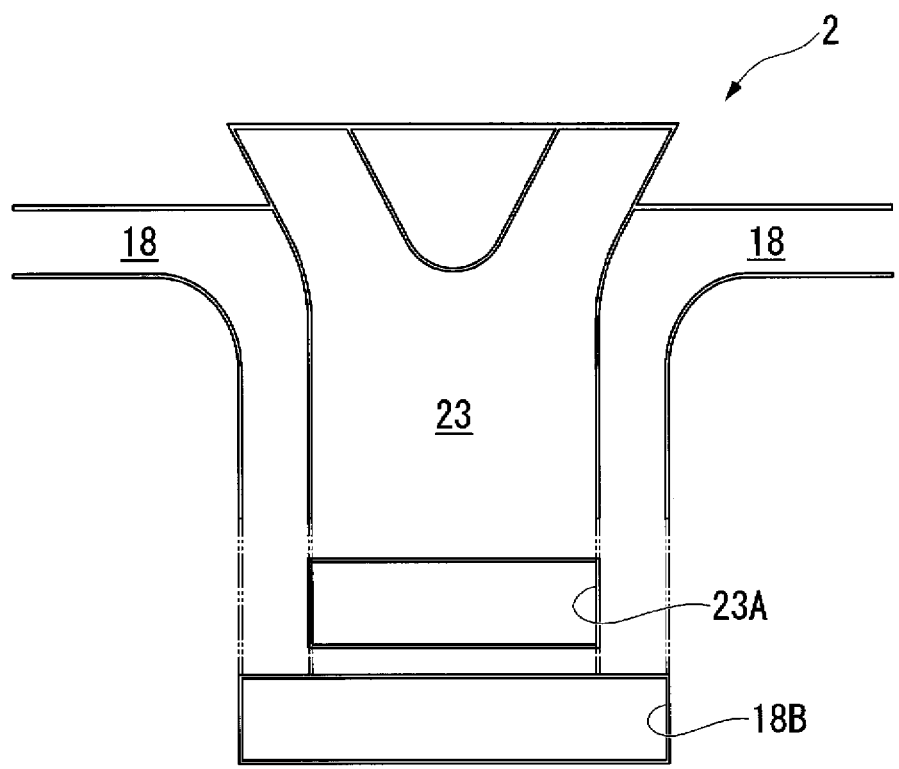
FIG. 4 is a view taken along line IV-IV of FIG. 3 as seen in the direction of arrows.

In more detail, as illustrated in FIG. 3, the rear face flow passages 23 vertically extend from an upper end of the air mixing space 8 along regions above the heating space 7. Furthermore, as illustrated in FIG. 4, when seen from the side in the front-back direction, the rear face flow passages 23 are each interposed between the pair of foot flow passages 18 from both sides in the width direction. The foot flow passages 18 are disposed at a distance from each other in the width direction. The pair of foot flow passages 18 extend in a direction from top to bottom as does the corresponding rear face flow passage 23.

An outlet end portion (rear face outlet 23A) of the rear face flow passage 23 is located above an outlet end portion (rear foot outlet 18B) of the foot flow passages 18.

Moreover, as illustrated in FIGS. 2 and 3, the rear face flow passages 23 and the foot flow passages 18 at least partially overlap each other when seen in the width direction. In other words, the plane of projection of the rear face flow passages 23 and the plane of projection of the foot flow passages 18 in the width direction partially overlap each other. Furthermore, downstream ends (to which the air supplied from the air mixing space 8 flows) of the foot flow passages 18 join together to form a flow passage at a region downstream of the above-described overlapping part.

The defrost flow passage 20 is located in front of the face flow passage 19 having the above-described configuration in the front-back direction of the vehicle. The defrost flow passage 20 is a flow passage configured to send air used for defrosting (deicing) the windshield.

The face damper 25 is disposed between the face flow passage 19 and the defrost flow passage 20. The face damper 25 is a planar member rotatable about a third axial line A3 extending in the width direction. The face damper 25 is rotatable between a face position (indicated by solid lines in FIG. 2) and a defrost position (indicated by dashed lines in FIG. 2). The defrost flow passage 20 further includes the defrost damper 26 that adjust the volume of air flowing into the defrost flow passage 20. The volume of air for defrosting is adjusted by adjusting rotation of the defrost damper 26.

According to the above-described configuration, the rear face flow passages 23 and the foot flow passages 18 partially overlap each other when seen in the width direction of the vehicle. This results in a reduction in size of the device in the front-back direction of the vehicle. Furthermore, the rear face flow passages 23 are independent from the other flow passages. This allows the air inside the air mixing space 8 to be directly led to the rear face flow passages 23 without the volume of air being reduced. That is, the air conditioning device 100 can be small yet can supply a sufficient volume of air.

Furthermore, according to the above-described configuration, each of the side face flow passages 24 is disposed between the center face flow passage 22 and the corresponding rear face flow passage 23. That is, the flow passages are disposed in the width direction of the vehicle. This results in a reduction in size of the device in the front-back direction of the vehicle.

Additionally, according to the above-described configuration, the overlapping part of the rear face flow passages 23 and the foot flow passages 18 extends vertically. Thus, the size of the device in the front-back direction of the vehicle can be reduced compared with a case where the flow passages extend in the front-back direction of the vehicle.

Furthermore, according to the above-described configuration, the pair of foot flow passages 18 join together downstream of the part where the foot flow passages 18 and the rear face flow passages 23 overlap each other (when seen in the width direction). This prevents a reduction in the volume of air supplied from the foot flow passages 18.

The embodiment of the present invention has been described as above. However, the above-described configuration is only a specific instance, and various modifications are possible within the scope of the present invention.

INDUSTRIAL APPLICABILITY

According to the above-described air conditioning device for the vehicle, the air conditioning device for the vehicle is small yet can supply a sufficient volume of air.

REFERENCE SIGNS LIST

100 Air conditioning device for vehicle
1 Blower
2 Air conditioning unit
3 Evaporator
4 Heater core
5 Unit case
6 Cooling space
7 Heating space
8 Air mixing space
9 Introduction space
10 Cold-air supply space
11 Second introduction space
12 Hot-air supply space
13 Return space
14 Air mixing damper
15 First rotating shaft portion
16 Air mixing damper body
17 Reheating prevention damper
18 Foot flow passage
18A Front foot outlet
18B Rear foot outlet
19 Face flow passage
20 Defrost flow passage
21 Foot damper
22 Center face flow passage
23 Rear face flow passage
23A Rear face outlet
24 Side face flow passage
25 Face damper
26 Defrost damper
A1 First axial line
A2 Second axial line
A3 Third axial line

The invention claimed is:

1. An air conditioning device for a vehicle disposed inside the vehicle, the air conditioning device comprising:
   an evaporator configured to cool air;
   a heater core configured to heat air; and
   a unit case including a cooling space accommodating the evaporator, a heating space accommodating the heater core and connected to the cooling space, and an air mixing space connected to the cooling space and the heating space, wherein
   the air mixing space fluidically communicates with:
   a face flow passage which is partitioned in a width direction of the vehicle into a center face flow passage, a pair of side face flow passages, and a pair of rear face flow passages such that the center face flow passage, the pair of side face flow passages, and the pair of rear face flow passages are aligned in the width direction of the vehicle,
   a pair of foot flow passages extending from the air mixing space and disposed at a distance from each other in the width direction of the vehicle to hold the pair of rear face flow passages between the pair of foot flow passages in the width direction of the vehicle,
   the pair of rear face flow passages and the pair of foot flow passages overlap each other at a part when seen in the width direction of the vehicle,
   each rear face flow passage of the pair of rear face flow passages is disposed to hold the center face flow passage from a respective side of the center face flow passage in the width direction of the vehicle, and
   each rear face flow passage of the pair of rear face flow passages is disposed between the center face flow passage and a respective side face flow passage of the pair of side face flow passages.

2. The air conditioning device for the vehicle according to claim 1, wherein the part at which the pair of rear face flow passages and the pair of foot flow passages overlap each other when seen at least in the width direction of the vehicle extends vertically.

3. The air conditioning device for the vehicle according to claim 1, wherein the pair of foot flow passages join together downstream of the overlapping part when seen in the width direction of the vehicle.

4. The air conditioning device for the vehicle according to claim 3, wherein the pair of foot flow passages communicate with a rear foot outlet, and an outlet of the pair of rear face flow passages is disposed above the rear foot outlet; and thereby the pair of foot flow passages join together in a region further downstream of the overlapping part when seen in the width direction of the vehicle at a downstream position remote from the overlapping part.

* * * * *